US011686448B1

(12) United States Patent
Liu

(10) Patent No.: US 11,686,448 B1
(45) Date of Patent: Jun. 27, 2023

(54) APPARATUS OF PROJECTOR HEADLIGHTS

(71) Applicant: Wei Liu, Arlington, TN (US)

(72) Inventor: Wei Liu, Arlington, TN (US)

( * ) Notice: Subject to any disclaimer, the term of this patent is extended or adjusted under 35 U.S.C. 154(b) by 0 days.

(21) Appl. No.: 17/699,103

(22) Filed: Mar. 19, 2022

(51) Int. Cl.

| | |
|---|---|
| ***B60Q 1/00*** | (2006.01) |
| ***F21S 41/683*** | (2018.01) |
| ***F21S 41/32*** | (2018.01) |
| ***F21S 41/43*** | (2018.01) |
| ***F21S 41/25*** | (2018.01) |
| *F21W 102/135* | (2018.01) |

(52) U.S. Cl.
CPC ............. *F21S 41/683* (2018.01); *F21S 41/25* (2018.01); *F21S 41/32* (2018.01); *F21S 41/43* (2018.01); *F21W 2102/135* (2018.01)

(58) Field of Classification Search
None
See application file for complete search history.

(56) References Cited

U.S. PATENT DOCUMENTS

| | | | | |
|---|---|---|---|---|
| 2,466,430 | A | 4/1949 | Miller et al. | |
| 3,507,563 | A | 4/1970 | Berman et al. | |
| 4,814,950 | A | 3/1989 | Nakata | |
| 5,373,392 | A | 12/1994 | Bala | |
| 5,923,456 | A | 7/1999 | Tench et al. | |
| 7,563,008 | B2 | 7/2009 | Chinniah et al. | |
| 2005/0122734 | A1* | 6/2005 | Foust | B60Q 1/14 362/539 |
| 2005/0152151 | A1* | 7/2005 | Lisowski | F21S 41/689 362/513 |

(Continued)

FOREIGN PATENT DOCUMENTS

| | | | |
|---|---|---|---|
| EP | 2390561 | A1 | 11/2011 |
| EP | 2690348 | A2 | 1/2014 |
| EP | 2366940 | B1 | 5/2018 |

OTHER PUBLICATIONS

Lifewire, "What Are Projector Headlights? ". https://www.lifewire.com/what-are-projector-headlights-4582305.

(Continued)

*Primary Examiner* — Elmito Breval

(57) ABSTRACT

This invention is a projector headlight that, while offering dual beam patterns, boasts a 100% utilization of the light emitted from a light source by one of the following methods: (1) employing a reflective cutoff shield means to reflect the incoming light from said light source back to the reflector to enhance the illumination in low-beam pattern, (2) using reversible cutoff shield means to reflect the incoming light from said light source back to the reflector to enhance the illumination in low-beam pattern with no moving part involved, (3) utilizing a selective light-filter cutoff means to selectively reflect the incoming light from said light source back to the reflector to enhance the illumination in low-beam pattern without making use of any moving part, (4) using a low-beam light-emitting subassembly and a high-beam light-emitting subassembly that are separated by partition means to achieve dual beam patterns with no moving part, or (5) adopting a low-beam light-emitting subassembly in low-beam pattern and a high-beam light-emitting subassembly in high-beam pattern without any moving part.

26 Claims, 12 Drawing Sheets

(56) References Cited

U.S. PATENT DOCUMENTS

2010/0309680 A1 12/2010 Akutagawa et al.

OTHER PUBLICATIONS

Scientific American, "Glass Switches from Transparent to Reflective without Drawing on Power", https://www.scientificamerican.com/article/glass-switches-from-transparent-to-reflective-without-drawing-on-power-video/.
Journal of Materials Chemistry, "A copper-based reversible electrochemical mirror device with switchability between transparent, blue, and mirror states", https://pubs.rsc.org/en/content/articlelanding/2017/tc/c7tc01070b.
Yuan Chang Liou, "Design of a projector headlamp without using a screen", https://citeseerx.ist.psu.edu/viewdoc/download?doi=10.1.1.887.9683&rep=rep1&type=pdf.
Wikipedia, "Headlamp", https://en.wikipedia.org/wiki/Headlamp.

* cited by examiner

APPARATUS OF PROJECTOR HEADLIGHTS

CROSS-REFERENCE TO RELATED APPLICATIONS

None

STATEMENT REGARDING FEDERALLY SPONSORED RESEARCH OR DEVELOPMENT

This is solely my personal invention and is not made with or related to any federal funding.

REFERENCE TO A "SEQUENCE LISTING"

None

BACKGROUND OF THE INVENTION

In pursuit of the best possible performance, various designs have been attempted and tried.

BRIEF SUMMARY OF THE INVENTION

This invention is a projector headlight that, while offering dual beam patterns, boasts a 100% utilization of the light emitted from a light source by one of the following methods: (1) employing a reflective cutoff shield means to reflect the incoming light from said light source back to the reflector to enhance the illumination in low-beam pattern, (2) using reversible cutoff shield means to reflect the incoming light from said light source back to the reflector to enhance the illumination in low-beam pattern with no moving part involved, (3) utilizing a selective light-filter cutoff means to selectively reflect the incoming light from said light source back to the reflector to enhance the illumination in low-beam pattern without making use of any moving part, (4) using a low-beam light-emitting subassembly and a high-beam light-emitting subassembly that are separated by partition means to achieve dual beam patterns with no moving part, or (5) adopting a low-beam light-emitting subassembly in low-beam pattern and a high-beam light-emitting subassembly in high-beam pattern without any moving part.

DETAILED DESCRIPTION OF THE INVENTION

It is important to note that, in this "Detailed Description of the Invention" section and in the "Claims" section below, the term "projector headlight" includes any type of projector-style illumination devices, regardless of what light sources are, what materials their parts are made of, or how said projector-style illumination devices are used in various applications. And the projector headlight used on motor vehicles is only one of the intended types. Five design approaches are described in the following paragraphs.

First Design Approach (Claims 1-5)

Figure 1:
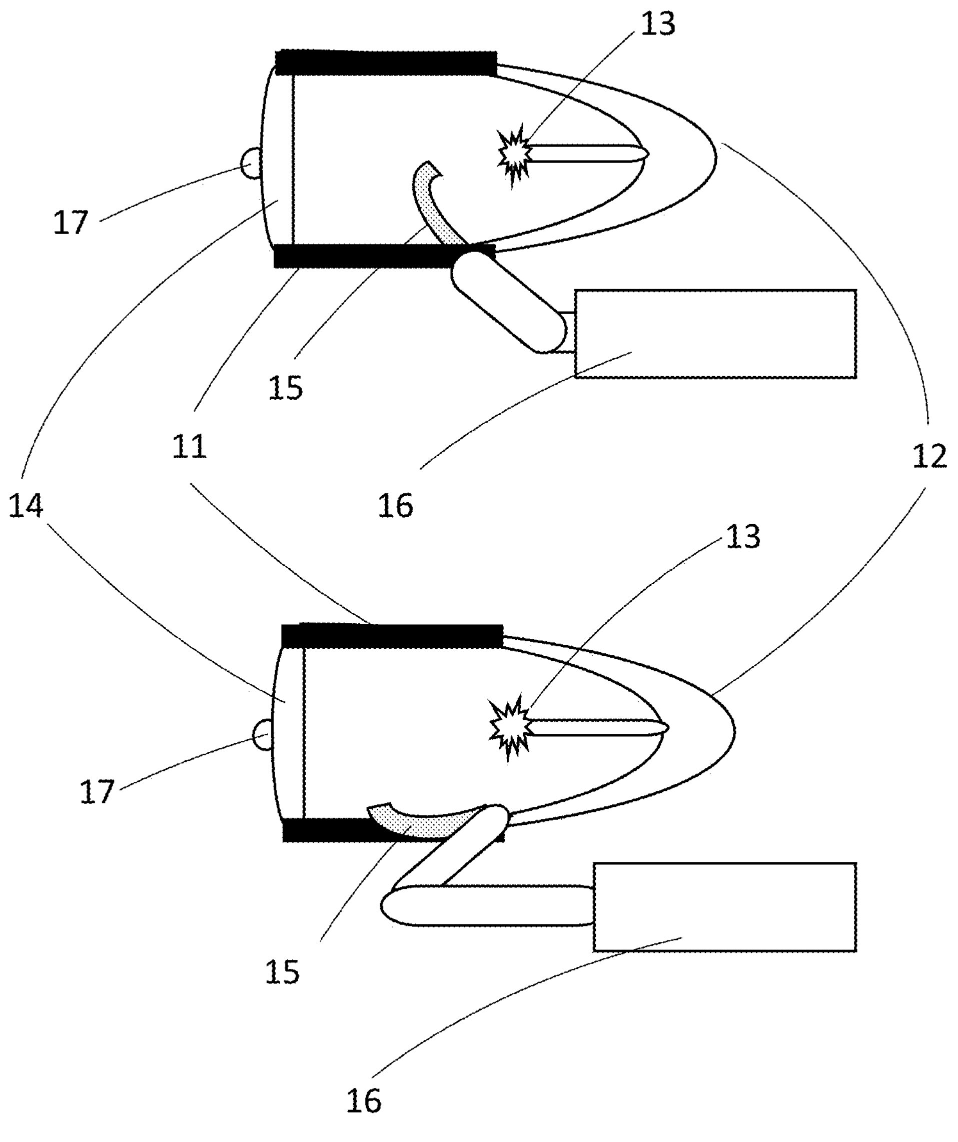
FIG. 1 shows a scheme of a projector headlight with reflective cutoff shield means.

In the first design approach, a projector headlight 11 (FIG. 1) comprises a reflector 12 (FIG. 1) having a predetermined shape, a light source 13 (FIG. 1) disposed at a predetermined position, a condenser lens 14 (FIG. 1) having predetermined optical characteristics, and reflective cutoff shield means 15 (FIG. 1) for reflecting the incoming light disposed in a predetermined position. Said reflective cutoff shield means 15 (FIG. 1) is reflective to the incoming light from said light source 13 (FIG. 1) and is moveable between a predetermined low-beam position and a predetermined high-beam position. As shown in FIG. 1, said reflective cutoff shield means comprises a reflective cutoff shield 15 (FIG. 1) having a predetermined shape and/or predetermined dimensions. It is essential to note that other types of reflective cutoff shields may also be applicable, such as a reflective cutoff shield made from components with prism optical characteristics, a reflective cutoff shield that moves up and down to get into and out of predetermined positions instead of rotating in and out, or a combination thereof. Said reflective cutoff shield 15 (FIG. 1) is moved to said predetermined low-beam position in low-beam pattern or moved to said predetermined high-beam position in high-beam pattern by an actuator 16 (FIG. 1). In said predetermined low-bean position, said reflective cutoff shield 15 (FIG. 1) reflects the incoming light from said light source 13 (FIG. 1) back to said reflector 12 (FIG. 1) via a predetermined spatial pathway to enhance the illumination in said low-beam pattern.

Figure 2:
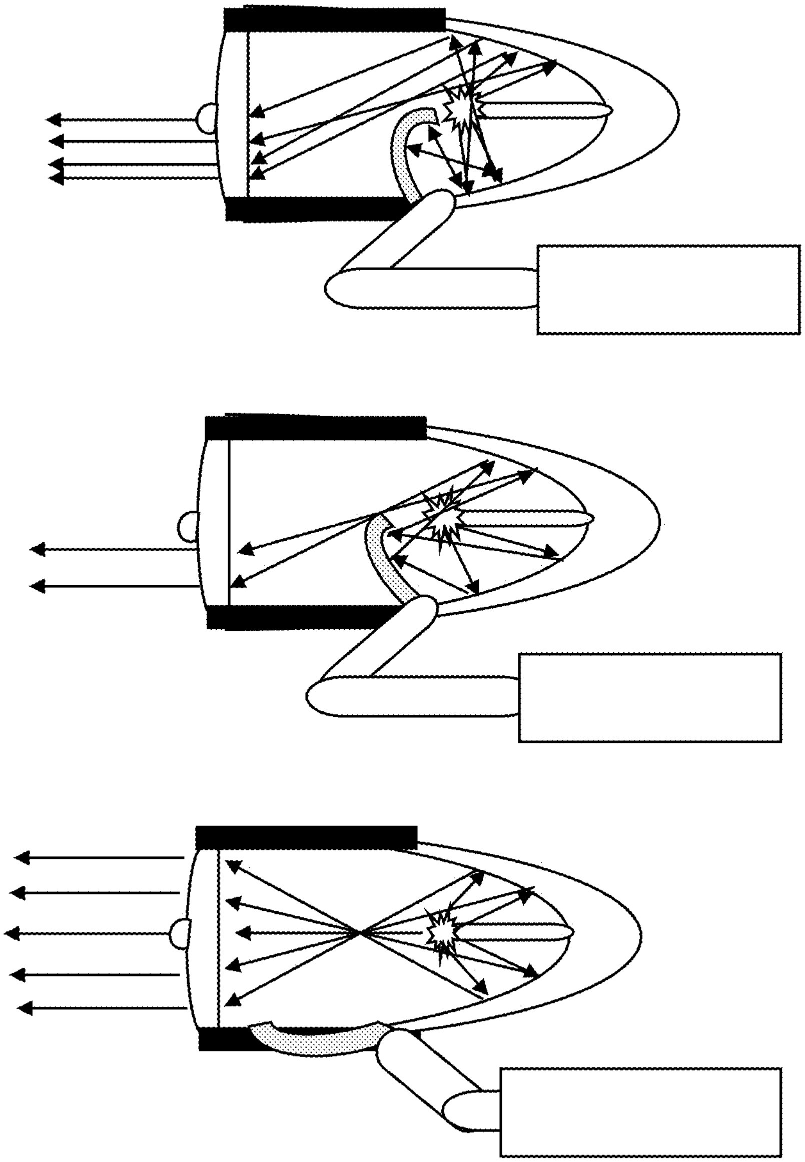
FIG. 2 illustrates how light travels inside said projector headlight with a reflective cutoff shield.

One viable option for said predetermined spatial pathway is such that said reflective cutoff shield 15 (FIG. 1) reflects said incoming light back to said reflector 12 (FIG. 1) via substantially the same spatial pathway that said incoming light comes from, as illustrated by the top drawing in FIG. 2. Another viable option for said predetermined spatial pathway is one in which said incoming light is reflected back to said reflector 12 (FIG. 1) via a spatial pathway approximately passing through the position of said light source 13 (FIG. 1), as displayed by the middle drawing in FIG. 2. As such, said incoming light will subsequently bounce off said reflector 12 (FIG. 1) and will travel to said condenser lens 14 (FIG. 1) in substantially the same way that the rest of the light from said light source 13 (FIG. 1) does. Both of said viable options described above will enhance the illumination in said low-beam pattern. In simple words, 100% of the light from said light source 13 (FIG. 1) will be utilized for said illumination in said low-beam pattern. In said high-beam pattern, said reflective cutoff shield is lowered to said predetermined high-beam position to allow said incoming to reach said condenser lens, as shown by the bottom drawing in FIG. 2. In contrast, the design of current dual-beam projector headlights employs a metal blade to block said incoming light in said low-beam pattern, resulting in a meager 50% utilization rate.

Electively, said condenser lens 14 (FIG. 1) may comprise at least one optical treatment, such as a raised ridge 17 (FIG. 1) or a Fresnel ring, to improve said low-beam pattern and/or said high-beam pattern. Other optical treatment options may include lens coating, lens film(s), graded opaque, etc. to create some desired optical/visual results, e.g., a "cat eye" facade. FIG. 2 illustrates how the light from said light source 13 (FIG. 1) travels in said low-beam pattern (via two different spatial pathways) and in said high-beam pattern respectively.

Second Design Approach (Claims 6-13)

Figure 3:
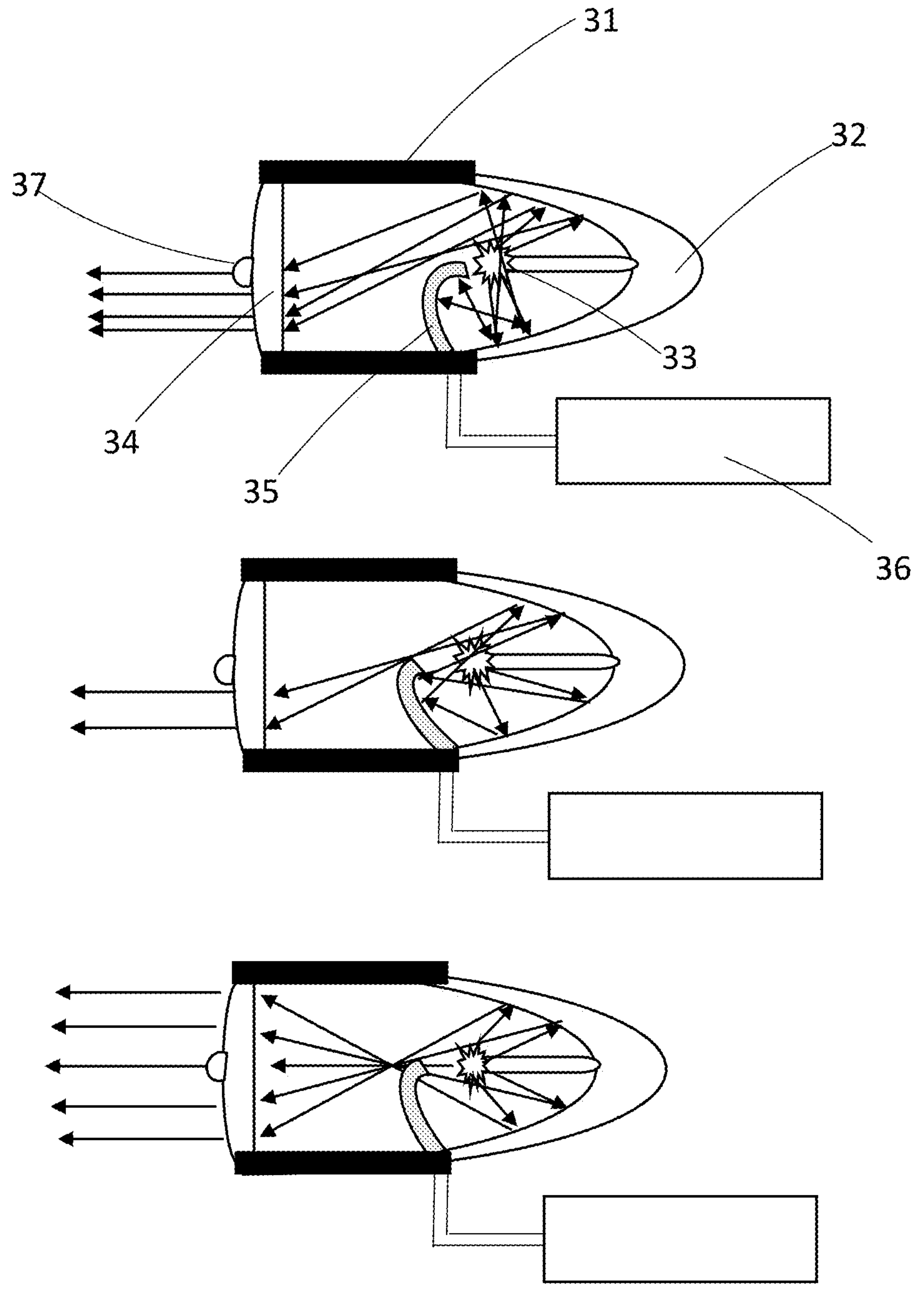
FIG. 3 demonstrates a scheme of a projector headlight with a reversible electrochemical reflective cutoff shield.
Figure 4:
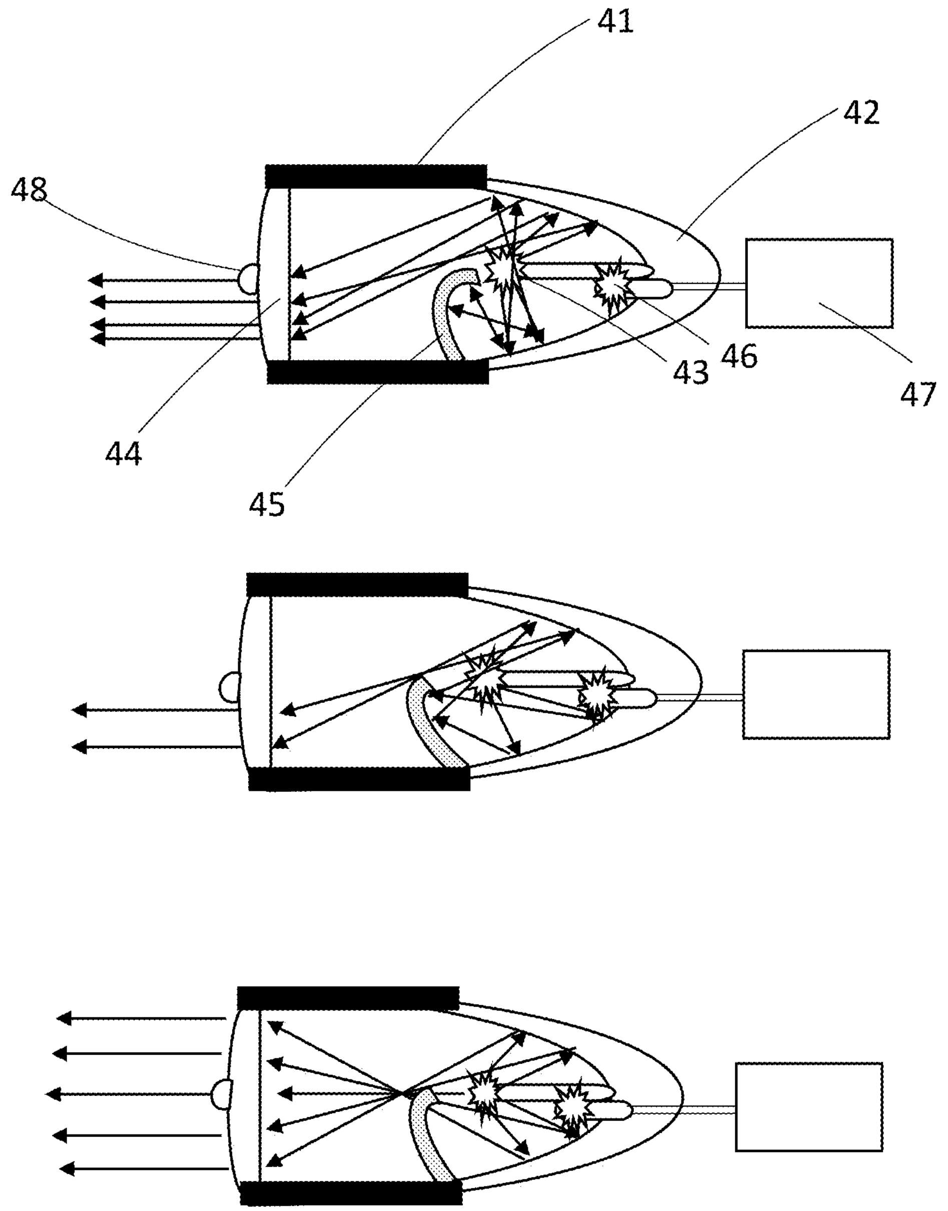
FIG. 4 shows a scheme of a scheme of a projector headlight with a reversible photochromic reflective cutoff shield.

In this second design approach, a projector headlight 31 (FIG. 3) & 41 (FIG. 4) comprises a reflector 32 (FIG. 3) & 42 (FIG. 4) having a predetermined shape, a light source 33 (FIG. 3) & 43 (FIG. 4) disposed at a predetermined position, a condenser lens 34 (FIG. 3) & 44 (FIG. 4) having predetermined optical characteristics, and reversible cutoff shield means 35 (FIG. 3) & 45 (FIG. 4). As shown in FIG. 3, said reversible cutoff shield means comprises a reversible electrochemical cutoff shield 35 (FIG. 3) having a predetermined shape, while, in FIG. 4, said reversible cutoff shield means comprises a reversible photochromic cutoff shield 45 (FIG. 4) having a predetermined shape. It is worthwhile to note that other types of reversible cutoff shields may also be applicable, such as a reversible cutoff shield that uses light interference effect, LED/OLED, liquid crystal elements, or a combination thereof. Said reversible electrochemical cutoff shield 35 (FIG. 3) and said reversible photochromic cutoff shield 45 (FIG. 4) are switchable between a non-transparent state in low-beam pattern and a transparent state in high-beam pattern. Said reversible electrochemical cutoff shield 35 (FIG. 3) can be activated and deactivated by various methods, including a predetermined voltage regulated by an electronic control device 36 (FIG. 3), while said reversible photochromic cutoff shield 45 (FIG. 4) can be activated and deactivated in a variety of ways, including a source of UV rays 46 (FIG. 4) controlled by an electronic control device 47 (FIG. 4).

Moreover, said reversible electrochemical cutoff shield 35 (FIG. 3) and said reversible photochromic cutoff shield 45 (FIG. 4), by the virtue of said predetermined shapes of theirs, reflect the incoming light from said light source 33 (FIG. 3) & 43 (FIG. 4) back to said reflector 32 (FIG. 3) & 42 (FIG. 4) via a predetermined spatial pathway in said low-beam pattern respectively. As depicted by the top drawings of FIGS. 3 & 4, one desirable option for said predetermined spatial pathway is one in which said reversible electrochemical cutoff shield 35 (FIG. 3) and said reversible photochromic cutoff shield 45 (FIG. 4) respectively reflect said incoming light back to said reflector 32 (FIG. 3) & 42 (FIG. 4) via substantially the same spatial pathway that said incoming light comes. Another viable option is such that said reversible electrochemical cutoff shield 35 (FIG. 3) and said reversible photochromic cutoff shield 45 (FIG. 4) respectively reflect said incoming light back to said reflector 32 (FIG. 3) & 42 (FIG. 4) via a spatial pathway approximately passing through the position of said light source 33 (FIG. 3) & 43 (FIG. 4), as displayed by the middle drawings of FIGS. 3 & 4. As a result, a 100% light utilization rate can be achieved in said low-beam pattern. The bottom drawings of FIGS. 3 & 4 illustrate how the light emitted from said light source 33 (FIG. 3) & 43 (FIG. 4) travels in said high-beam patterns respectively.

Additionally, said condenser lens 34 (FIG. 3) & 44 (FIG. 4) may comprise at least one optical treatment, such as a raised ridge 37 (FIG. 3) & 48 (FIG. 4) or a Fresnel ring, to improve said low-beam pattern and/or said high-beam pattern. Other optical treatment options may include lens coating, lens film(s), graded opaque, etc. to create some desired optical/visual results, e.g., a "cat eye" facade.

Third Design Approach (Claims 14-19)

Figure 5:
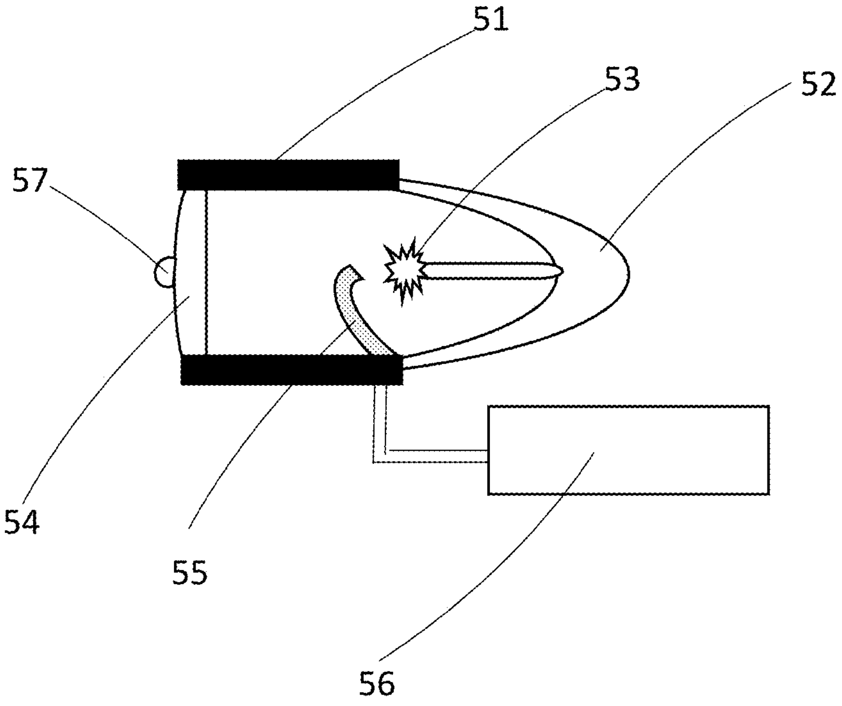
FIG. 5 presents a scheme of a projector headlight with selective light-filter cutoff means.

The third design approach is a projector headlight 51 (FIG. 5) that comprises a reflector 52 (FIG. 5) having a predetermined shape, a light source 53 (FIG. 5) that can emit light of at least two frequencies or wavelengths, a condenser lens 54 (FIG. 5) having predetermined optical characteristics, and selective light-filter cutoff means 55 (FIG. 5) for selectively blocking light from said light source 53 (FIG. 5). Said selective light-filter cutoff means 55 (FIG. 5) is non-transparent to the incoming light of the first frequency or wavelength of said at least two predetermined frequencies or wavelengths in low-beam pattern and is transparent to the incoming light of the second frequency or wavelength of said at least two frequencies or wavelengths in high-beam pattern. Said selective light-filter cutoff means 55 (FIG. 5) can perform its selective light-filtering function without any control input (e.g., a component made of or made from a predetermined material with such an optical capability) or can be controlled by an electronic control device 56 (FIG. 5). Furthermore, said selective light-filter cutoff means 55 (FIG. 5) comprises a predetermined shape and is reflective to said incoming light of said first frequency or wavelength in said low beam pattern, as will be illustrated by FIG. 6.

Figure 6:
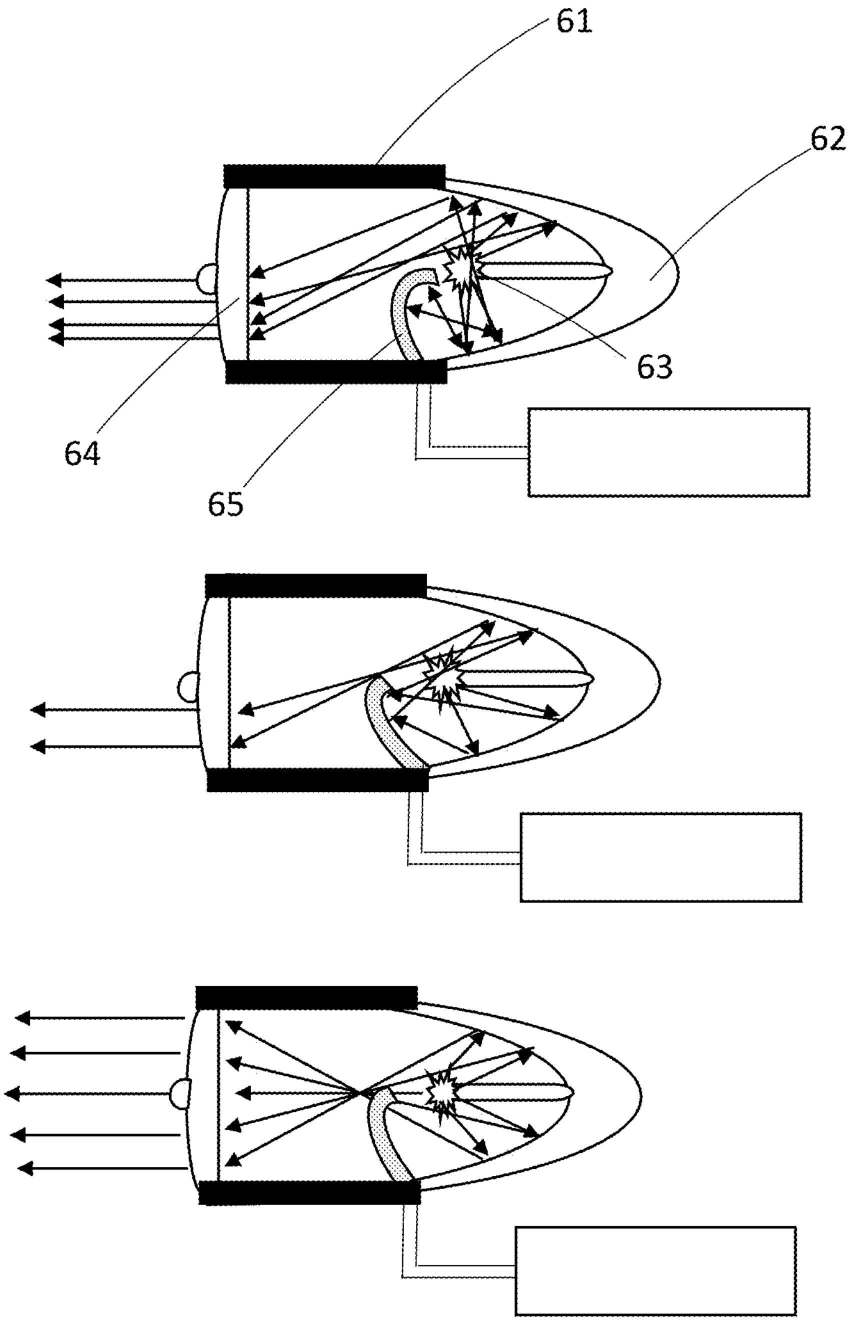
FIG. 6 shows how light travels inside said projector headlight with selective light-filter cutoff means in the form of a selective light-filter cutoff shield.

As presented by the project headlight 61 (FIG. 6) in FIG. 6, said selective light-filter cutoff means 55 (FIG. 5) comprises a selective light-filter cutoff shield 65 (FIG. 6) that has a predetermined shape, is non-transparent and reflective to said incoming light of said first frequency or wavelength in said low beam pattern, and is transparent to said incoming light of said second frequency or wavelength in said high-beam pattern. It is necessary to note that other types of selective light-filter cutoff shields may also be applicable, such as one that employs the effect of light interference for light filtering.

Figure 7:
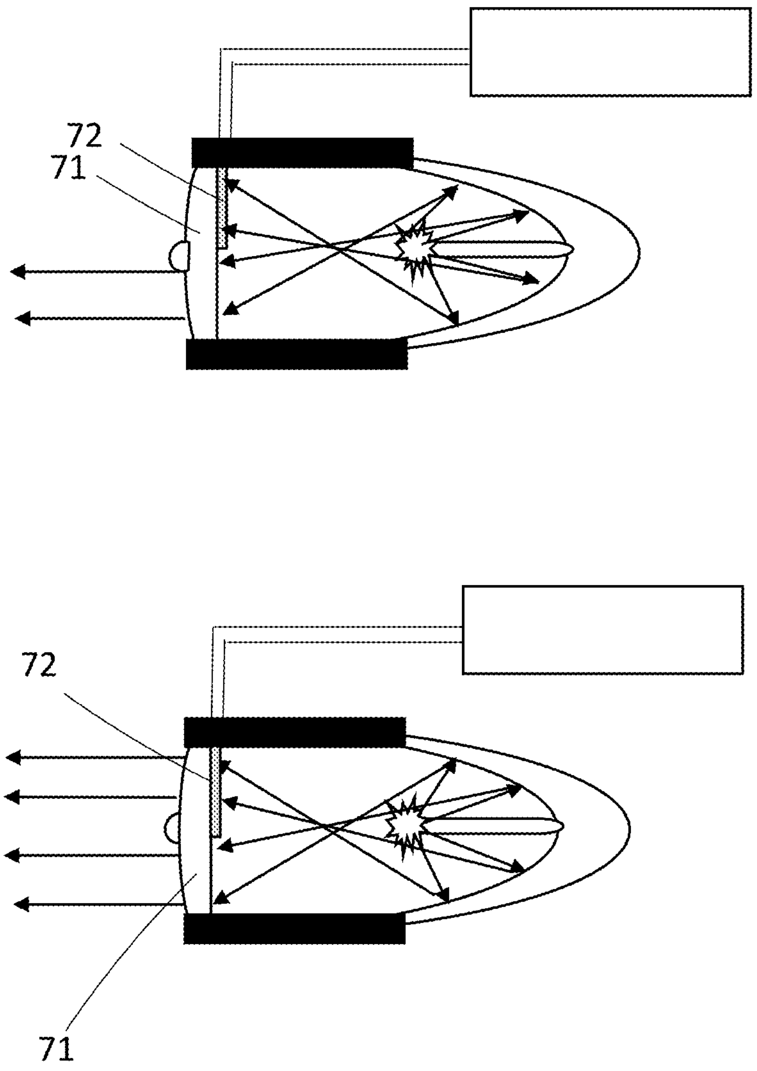
FIG. 7 describes a projector headlight with selective light-filter cutoff means attached to the interior side of condenser lens.
Figure 8:
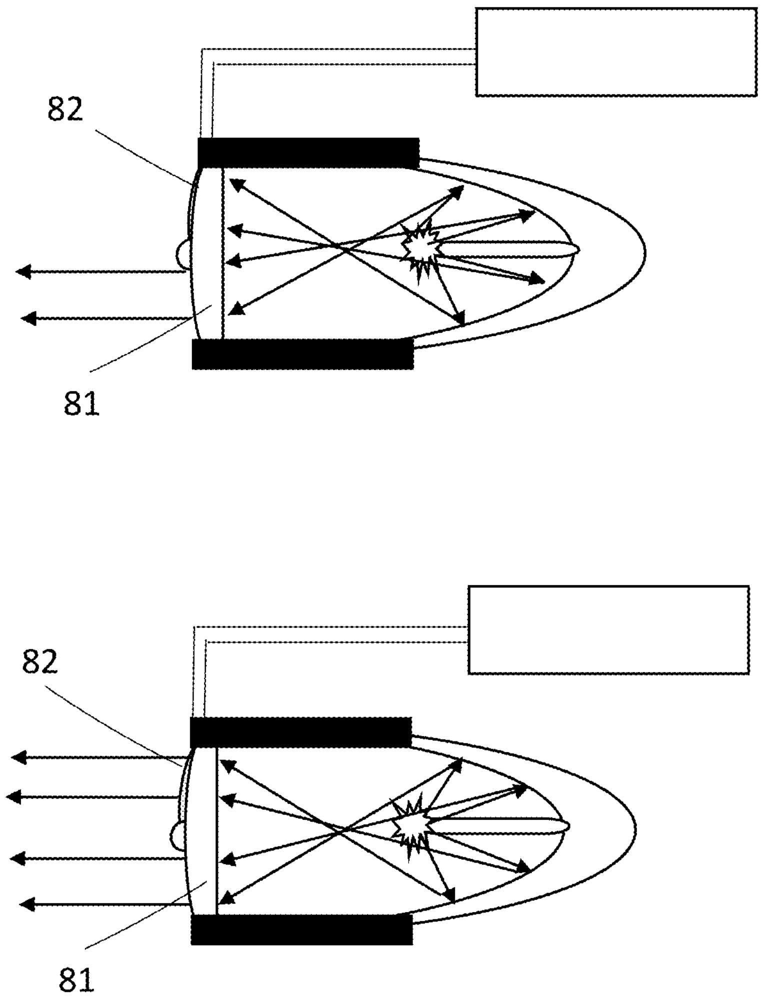
FIG. 8 illustrates a projector headlight with selective light-filter cutoff means attached to the exterior side of condenser lens.

Graphically displayed by the top drawing and the middle drawing in FIG. 6 is how said selective light-filter cutoff shield 65 (FIG. 6), by the virtue of its predetermined shape, reflects said incoming light of said first frequency or wavelength from said light source 63 (FIG. 6) back to said reflector 62 (FIG. 6) via a predetermined spatial pathway in said low-beam pattern, while said selective light-filter cutoff shield 65 (FIG. 6) allows said incoming light of said second frequency or wavelength to reach said condenser lens 64 (FIG. 6) in said high-beam pattern (shown by the bottom drawing in FIG. 6). One viable option for said predetermined spatial pathway is such that said selective light-filter cutoff shield 65 (FIG. 6) reflects said incoming light of said first frequency or wavelength back to said reflector 62 (FIG. 6) via substantially the same spatial pathway that said light of said first frequency or wavelength comes from, as shown by the top drawing in FIG. 6. Another feasible option for said predetermined spatial pathway is a spatial pathway approximately passing through the position of said light source 63 (FIG. 6) in said low-beam pattern, as illustrated by the middle graph in FIG. 6. Consequently, 100% of the light emitted from said light source 63 (FIG. 6) can be utilized for the illumination in said low-beam pattern. Said selective light-filter cutoff means 55 (FIG. 5) (e. g., said selective light-filter cutoff shield 65 (FIG. 6)) can be disposed in a predetermined position, such as near the image plane as shown in FIG. 6. As shown in FIG. 7, said selective light-filter cutoff means 72 (FIG. 7) can also be placed next to interior side of said condenser lens 71 (FIG. 7), whereas, in FIG. 8, said selective light-filter cutoff means 82 (FIG. 8) can be attached to the exterior side of said condenser lens 81 (FIG. 8).

Optionally, said condenser lens 54 (FIG. 5) may comprise at least one optical treatment, such as a raised ridge 57 (FIG. 5) or a Fresnel ring, to improve said low-beam pattern and/or said high-beam pattern. Other optical treatment options may include lens coating, lens film(s), graded opaque, etc. to create some desired optical/visual results, e.g., a "cat eye" facade. Another option for said condenser lens 54 (FIG. 5) is to comprise at least one optical treatment, to be structurally integrated with said selective light-filter cutoff means 55 (FIG. 5), or to comprise at least one optical treatment and to be structurally integrated with said selective light-filter cutoff means 55 (FIG. 5).

Fourth Design Approach (Claim 20-23)

Figure 9:
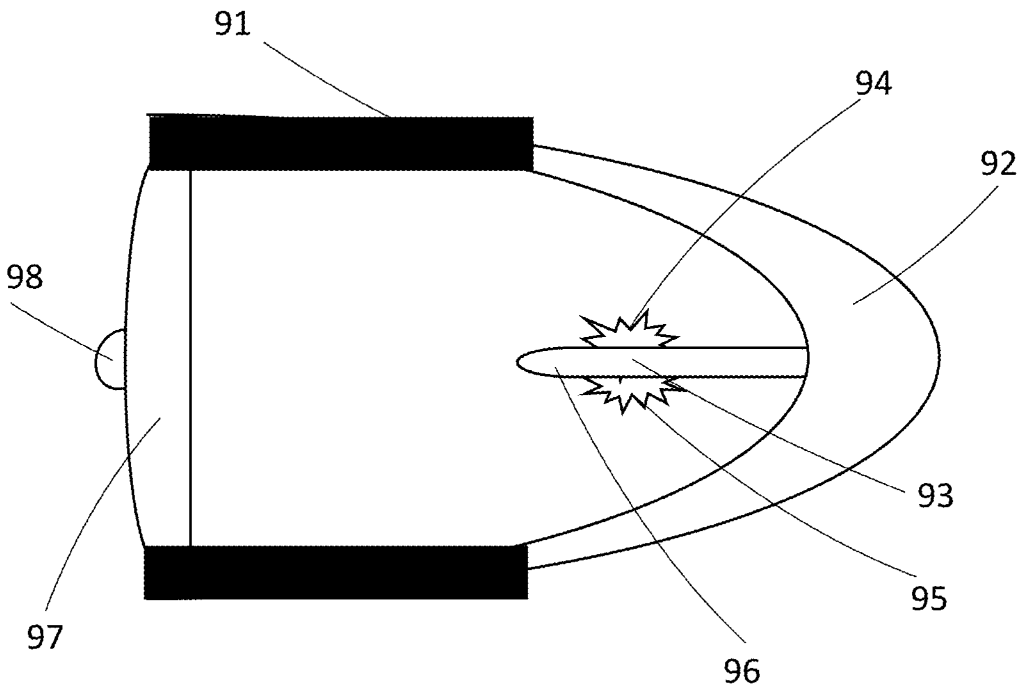
FIG. 9 is a scheme of a projector headlight with a low-beam light-emitting subassembly and a high-beam light-emitting subassembly separated by partition means.

In the fourth design approach, a projector headlight 91 (FIG. 9) comprises a reflector 92 (FIG. 9) having a predetermined shape, a light source 93 (FIG. 9) disposed in a predetermined position, and a condenser lens 97 (FIG. 9) having predetermined optical characteristics. Moreover, said light source 93 (FIG. 9) comprises a low-beam light-emitting subassembly 94 (FIG. 9), a switchable high-beam light-emitting subassembly 95 (FIG. 9), and partition means 96 (FIG. 9) for separating said low-beam light-emitting subassembly 94 (FIG. 9) from said switchable high-beam light-emitting subassembly 95 (FIG. 9). And said partition means 96 (FIG. 9) comprises a top side and a bottom side and said low-beam light-emitting subassembly 94 (FIG. 9) is disposed on said top side of said partition means 96 (FIG. 9) and said switchable high-beam light-emitting subassembly 95 (FIG. 9) is disposed on said bottom side of said partition means 96 (FIG. 9).

As displayed in FIG. 9, said partition means comprises a baffle 96 (FIG. 9) that has a top side and a bottom side and has predetermined dimensions and/or a predetermined shape. It is vital to note that other types of "dividers" may also be applicable and such "dividers" may comprise various shapes and/or dimensions as well, for instance a plane having structural indention(s), structural protrusion(s), curves, reflective surface(s), or a combination thereof. Said low-beam light-emitting subassembly 94 (FIG. 9) is powered on and said switchable high-beam light-emitting subassembly 95 (FIG. 9) is switched off in low-beam pattern and is switched on in high-beam pattern. As an option, said condenser lens 97 (FIG. 9) may comprise at least one optical treatment, such as a raised ridge 98 (FIG. 9) or a Fresnel ring, to improve said low-beam pattern and/or said high-beam pattern. Other optical treatment options may include lens coating, lens film(s), graded opaque, etc. to create some desired optical/visual results, e.g., a "crescent-eye" facade.

Figure 10:
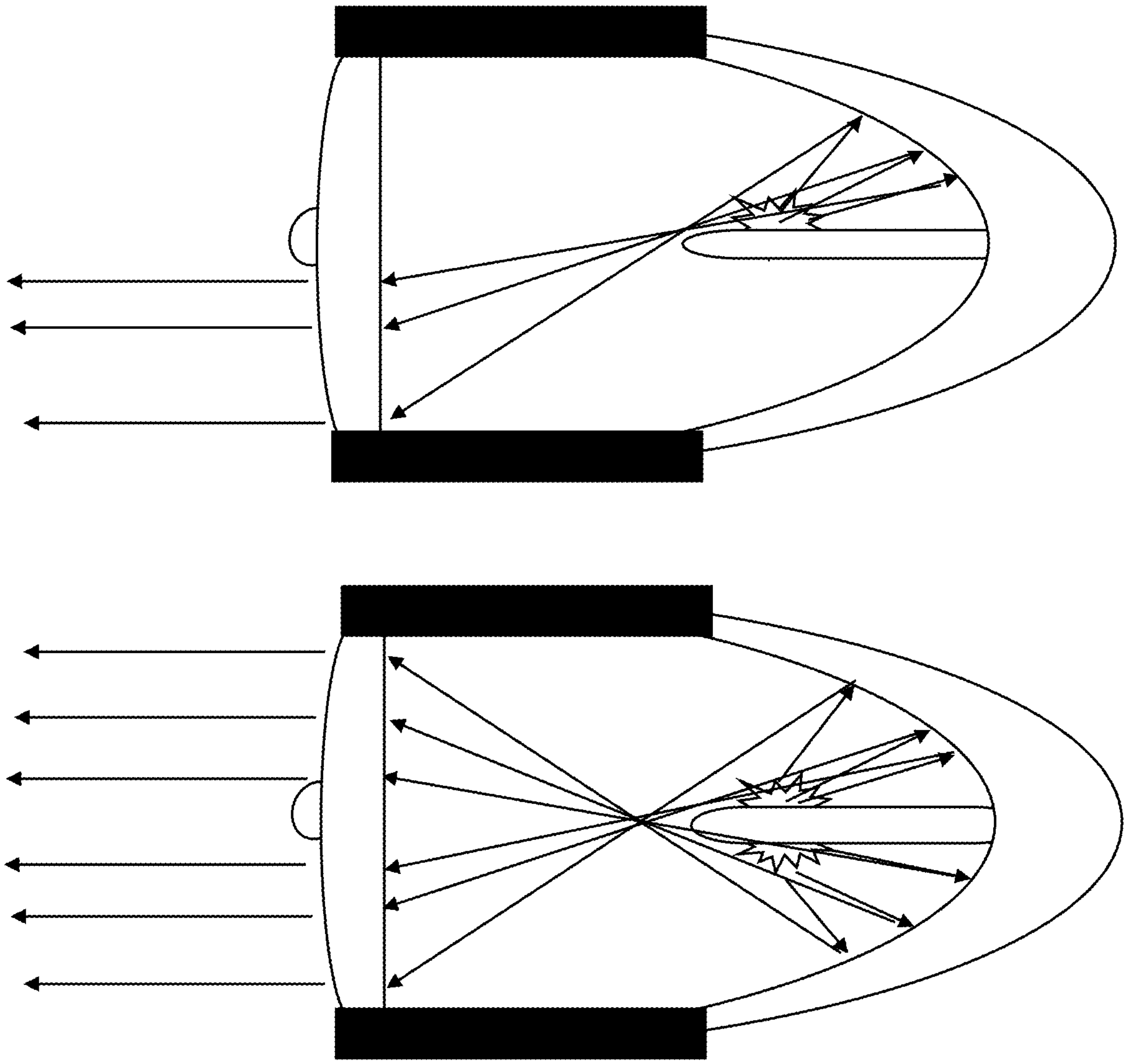
FIG. 10 shows how light travels inside said projector headlight with a low-beam light-emitting subassembly and a high-beam light-emitting subassembly separated by a baffle.

Shown by the top drawing in FIG. 10 is how said low-beam light-emitting subassembly 94 (FIG. 9) functions in said low-beam pattern, while the bottom drawing in FIG. 10 demonstrates how said high-beam light-emitting subassembly 95 (FIG. 9) performs in said high-beam pattern.

Fifth Design Approach (Claims 24-26)

Figure 11:
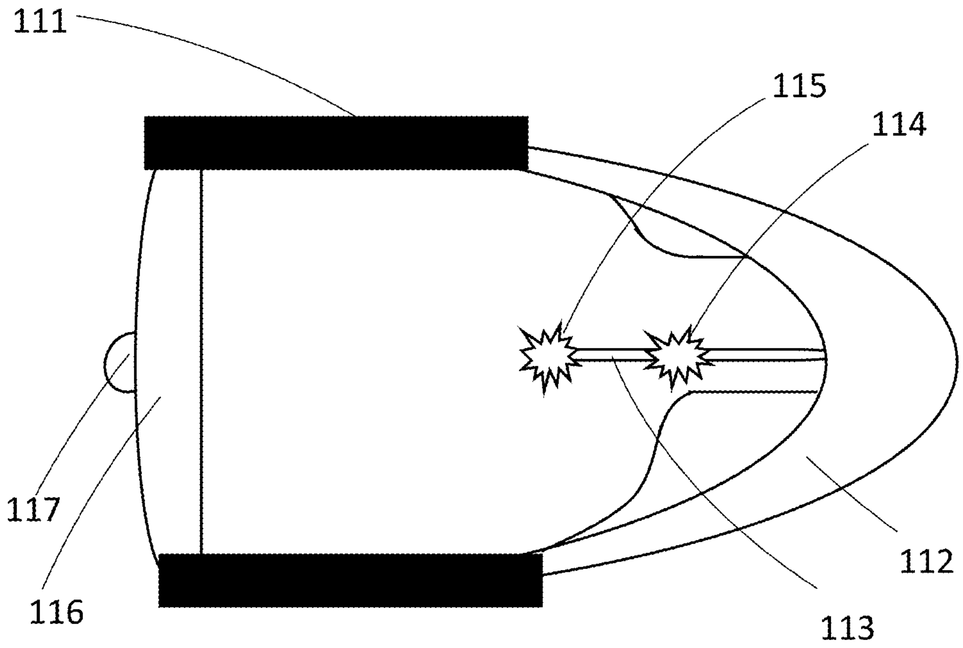
FIG. 11 displays a projector headlight with a switchable low-beam light-emitting subassembly and a switchable high-beam light-emitting subassembly.
Figure 12:
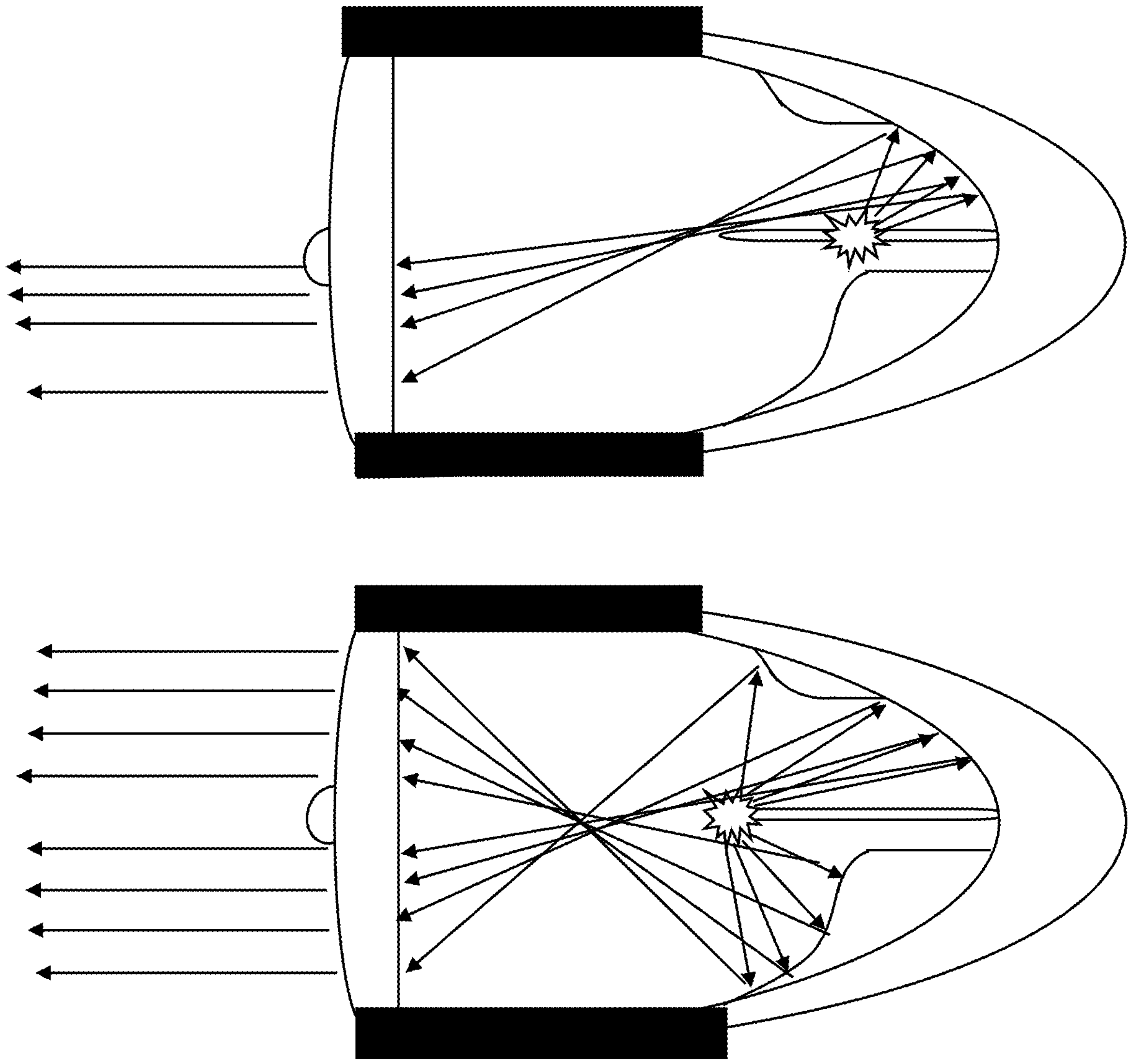
FIG. 12 explains how light travels inside said projector headlight with a switchable low-beam light-emitting subassembly and a switchable high-beam light-emitting subassembly.

In this design approach, a projector headlight 111 (FIG. 11) comprises a reflector 112 (FIG. 11) having a predetermined shape, a light source 113 (FIG. 11) having a switchable low-beam light-emitting subassembly 114 (FIG. 11) and a switchable high-beam light-emitting subassembly 115 (FIG. 11), a condenser lens 116 (FIG. 11) having predetermined optical characteristics. Said switchable low-beam light-emitting subassembly 114 (FIG. 11) is disposed in a predetermined low-beam position for low-beam pattern and said switchable high-beam light-emitting subassembly 115 (FIG. 11) is disposed in a predetermined high-beam position for high-beam pattern. Said switchable low-beam light-emitting subassembly 114 (FIG. 11) is powered on and said switchable high-beam light-emitting subassembly 115 (FIG. 11) is switched off in said low-beam pattern, whereas said switchable low-beam light-emitting subassembly 114 (FIG. 11) is switched off and said switchable high-beam light-emitting subassembly 115 (FIG. 11) is powered on in said high-beam pattern. The top drawing in FIG. 12 displays how the light from said switchable low-beam light-emitting subassembly 114 (FIG. 11) proceeds, and the bottom drawing in FIG. 12 presents how the light from said switchable high-beam light-emitting subassembly 115 (FIG. 11) travels. As an alternative, said switchable low-beam light-emitting subassembly 114 (FIG. 11) is switched on in said high-beam pattern.

Optionally, said condenser lens 116 (FIG. 11) may comprise at least one optical treatment, such as a raised ridge 117 (FIG. 11) or a Fresnel ring, to improve said low-beam pattern and/or said high-beam pattern. Other optical treatment options may include lens coating, lens film(s), graded opaque, etc. to create some desired optical/visual results, e.g., a "cat eye" facade.

In summary, my invention offers several advantages over the current dual-beam projector headlight designs, including the two following advantages. First, all of the five design approaches described above boast a 100% utilization rate of the light emitted from the light source in low-beam pattern vs. the 50% light utilization rate obtained in the current dual-beam project headlight designs. Second, all of the design approaches discussed herein, except the first one, have no moving part and entail less mechanical complexity than the current project headlight designs do, which can lead to higher reliability and longer durability.

The foregoing description of my invention, including the accompanying drawings, is related only to some of the exemplary, preferred embodiments, and selected applications of this invention, while its true scope, as set forth in said claims listed below, is intended to include all possible or plausible applications, configurations, options, and embodiments, and is not limited to those of the examples, applications, configurations, options, embodiments, and functions described above. In the same way, all drawings included in this application shall be considered as illustrative in nature and shall not be interpreted to be as restrictive as graphically depicted, and the configurations, options, features, functionalities that are shown in said drawings and/or are described above can be combined in a design, application, or embodiment as needed.

I claim:

1. A projector headlight, comprising:

a. a reflector comprising a predetermined shape, b. a light source disposed in a predetermined position, c. a condenser lens comprising predetermined optical characteristics and being disposed in a predetermined position, d. cutoff means for directing incoming light from said light source back to said reflector to enhance the illumination in low-beam pattern, and e. said light source being powered on and said cutoff means being moved to predetermined low-beam position in said low-beam pattern or being moved to predetermined high-beam position in high-beam pattern, whereby said low-beam pattern achieves 100% light utilization of said light source, eliminating the ubiquitous drawback of low light utilization in all existing dual-beam projector headlight designs.

2. The projector headlight of claim 1 wherein said cutoff means directs said incoming light back to said reflector via substantially the same spatial pathway that said incoming light comes from or via a spatial pathway approximately passing through the position of said light source to enhance said illumination in said low-beam pattern to achieve 100% light utilization of said light source, eliminating the ubiquitous drawback of low light utilization in all existing dual-beam projector headlight designs.

3. The projector headlight of claim 1 wherein said cutoff means is a reflective cutoff shield comprising a predetermined shape, predetermined dimensions, or a predetermined shape and predetermined dimensions, and said reflective cutoff shield is reflective to said incoming light and, in said predetermined low-beam position, reflects said incoming light back to said reflector via a predetermined spatial pathway to enhance said illumination in said low-beam pattern to achieve 100% light utilization of said light source, eliminating the ubiquitous drawback of low light utilization in all existing dual-beam projector headlight designs.

4. The projector headlight of claim 1 wherein said cutoff means is a reflective cutoff shield comprising a predetermined shape, predetermined dimensions, or a predetermined shape and predetermined dimensions, and said reflective cutoff shield is reflective to said incoming light and, in said predetermined low-beam position, reflects said incoming light back to said reflector via substantially the same spatial pathway that said incoming light comes from or via a spatial pathway approximately passing through the position of said light source to enhance said illumination in said low-beam pattern to achieve 100% light utilization of said light source, eliminating the ubiquitous drawback of low light utilization in all existing dual-beam projector headlight designs.

5. The projector headlight of claim 1 wherein said condenser lens comprises at least one optical treatment.

6. A projector headlight, comprising:

a. a reflector comprising a predetermined shape, b. a light source disposed in a predetermined position, c. a condenser lens comprising predetermined optical characteristics and being disposed in a predetermined position, d. cutoff means for blocking incoming light from said light source in a non-transparent state, and e. said light source being powered on and said cutoff means switching to said non-transparent state to block said incoming light from said light source from reaching said condenser lens in low-beam pattern or switching to transparent state to allow said incoming light to reach said condenser lens in high-beam pattern, whereby no moving part is needed to achieve said low-beam pattern and said high-beam pattern, eliminating the ubiquitous drawback of having a moving part in all existing dual-beam projector headlight designs.

7. The projector headlight of claim 6 wherein said cutoff means, directs said incoming light back to said reflector via a predetermined spatial pathway to enhance the illumination in said low-beam pattern to achieve 100% light utilization of said light source, eliminating the ubiquitous drawback of low light utilization in all existing dual-beam projector headlight designs.

8. The projector headlight of claim 6 wherein said cutoff means, directs said incoming light back to said reflector via substantially the same spatial pathway that said incoming light comes from or via a spatial pathway approximately passing through the position of said light source to enhance the illumination in said low-beam pattern to achieve 100% light utilization of said light source, eliminating the ubiquitous drawback of low light utilization in all existing dual-beam projector headlight designs.

9. The projector headlight of claim 6 wherein said cutoff means is a reversible electrochemical cutoff shield comprising a predetermined shape, being switchable between said non-transparent state and said transparent state, and being reflective to said incoming light in said non-transparent state, and further said reversible electrochemical cutoff shield switches to said non-transparent state to reflect said incoming light back to said reflector via a predetermined spatial pathway to enhance the illumination in said low-beam pattern, while said reversible electrochemical cutoff shield switches to said transparent state to allow said incoming light to reach said condenser lens in said high-beam pattern, thus said low-beam pattern achieves 100% light utilization of said light source and any moving part is avoided, eliminating the ubiquitous drawbacks of low light utilization and having a moving part in all existing dual-beam projector headlight designs.

10. The project headlight of claim 6 wherein said cutoff means is a reversible photochromic cutoff shield comprising a predetermined shape, being switchable between said non-transparent state and said transparent state, and being reflective to said incoming light in said non-transparent state, and further said reversible photochromic cutoff shield switches to said non-transparent state to reflect said incoming light back to said reflector via a predetermined spatial pathway to enhance the illumination in said low-beam pattern, while said reversible photochromic cutoff shield switches to said transparent state to allow said incoming light to reach said condenser lens in said high-beam pattern, thus said low-beam pattern achieves 100% light utilization of said light source and any moving part is avoided, eliminating the ubiquitous drawbacks of low light utilization and having a moving part in all existing dual-beam projector headlight designs.

11. The projector headlight of claim 6 wherein said cutoff means is a reversible electrochemical cutoff shield comprising a predetermined shape, being switchable between said non-transparent state and said transparent state, and being reflective to said incoming light in said non-transparent state, and further said reversible electrochemical cutoff shield switches to said non-transparent state to reflect said incoming light back to said reflector via substantially the same spatial pathway that said incoming light comes from or via a spatial pathway approximately passing through the position of said light source to enhance the illumination in said low-beam pattern, while said reversible electrochemical cutoff shield switches to said transparent state to allow said incoming light to reach said condenser lens in said high-beam pattern, thus said low-beam pattern achieves 100% light utilization of said light source and any moving part is avoided, eliminating the ubiquitous drawbacks of low light utilization and having a moving part in all existing dual-beam projector headlight designs.

12. The projector headlight of claim 6 wherein said cutoff means is a reversible photochromic cutoff shield comprising a predetermined shape, being switchable between said non-transparent state and said transparent state, and being reflective to said incoming light in said non-transparent state, and further said reversible photochromic cutoff shield switches to said non-transparent state to reflect said incoming light back to said reflector via substantially the same spatial pathway that said incoming light comes from or via a spatial pathway approximately passing through the position of said light source to enhance the illumination in said low-beam pattern, while said reversible photochromic cutoff shield switches to said transparent state to allow said incoming light to reach said condenser lens in said high-beam pattern, thus said low-beam pattern achieves 100% light utilization of said light source and any moving part is avoided, eliminating the ubiquitous drawbacks of low light utilization and having a moving part in all existing dual-beam projector headlight designs.

13. The projector headlight of claim 6 wherein said condenser lens comprises at least one optical treatment.

14. A projector headlight, comprising:

a. a reflector comprising a predetermined shape, b. a light source being disposed in a predetermined position and being able to emit light of at least two predetermined frequencies or wavelengths for low-beam pattern and high-beam pattern respectively, c. a condenser lens comprising predetermined optical characteristics and being disposed in a predetermined position, d. cutoff means for blocking incoming light of said first predetermined frequency or wavelength from said light source, and e. said light source being powered and said cutoff means blocking said incoming light of said first predetermined frequency or wavelength in said low-beam pattern or said cutoff means allowing incoming light of said second predetermined frequency or wavelength to reach said condenser lens in said high-beam pattern, whereby any moving part is avoided, eliminating the ubiquitous drawback of having a moving part in all existing dual-beam projector headlight designs.

15. The projector headlight of claim 14 wherein said cutoff means directs said incoming light of said first predetermined frequency or wavelength back to said reflector via a predetermined spatial pathway to enhance the illumination in said low-beam pattern, thus said low-beam pattern achieves 100% light utilization of said light source and any moving part is avoided, eliminating the ubiquitous drawbacks of low light utilization and having a moving part in all existing dual-beam projector headlight designs.

16. The projector headlight of claim 14 wherein said cutoff means directs said incoming light of said first predetermined frequency or wavelength back to said reflector via substantially the same spatial pathway that said incoming light of said first predetermined frequency or wavelength comes from or via a spatial pathway approximately passing through the position of said light source to enhance the illumination in said low-beam pattern, thus said low-beam pattern achieves 100% light utilization of said light source and any moving part is avoided, eliminating the ubiquitous drawbacks of low light utilization and having a moving part in all existing dual-beam projector headlight designs.

17. The projector headlight of claim 14 wherein said cutoff means is a selective cutoff shield that comprises a predetermined shape, is reflective to said incoming light of said first predetermined frequency or wavelength, and reflects said incoming light of said first predetermined frequency or wavelength back to said reflector via a predetermined spatial pathway to enhance the illumination in said low-beam pattern, while said selective cutoff shield allows said incoming light of said second predetermined frequency or wavelength to reach said condenser lens in said high-beam pattern, thus said low-beam pattern achieves 100% light utilization of said light source and any moving part is avoided, eliminating the ubiquitous drawbacks of low light utilization and having a moving part in all existing dual-beam projector headlight designs.

18. The projector headlight of claim 14 wherein said cutoff means is a selective cutoff shield that comprises a predetermined shape, is reflective to said incoming light of said first predetermined frequency or wavelength, and reflects said incoming light of said first predetermined frequency or wavelength back to said reflector via substantially the same spatial pathway that said incoming light of said first predetermined frequency or wavelength comes from or via a spatial pathway approximately passing through the position of said light source to enhance the illumination in said low-beam pattern, while said selective cutoff shield allows said incoming light of said second predetermined frequency or wavelength to reach said condenser lens in said high-beam pattern, thus said low-beam pattern achieves 100% light utilization of said light source and any moving part is avoided, eliminating the ubiquitous drawbacks of low light utilization and having a moving part in all existing dual-beam projector headlight designs.

19. The projector headlight of claim 14 wherein said condenser lens comprises at least one optical treatment, is integrated with said cutoff means, or comprises at least one optical treatment and is integrated with said selective cutoff means.

20. A projector headlight, comprising:

a. a reflector having a predetermined shape, b. a light source being disposed in a predetermined position and comprising a low-beam light-emitting subassembly, a switchable high-beam light-emitting subassembly disposed approximately below said low-beam light-emitting subassembly, and partition means for separating the function of said low-beam light-emitting subassembly from that of said switchable high-beam light-emitting subassembly, c. a condenser lens comprising predetermined optical characteristics and being disposed in a predetermined position, and d. said low-beam light-emitting subassembly being powered on and said switchable high-beam light-emitting subassembly being switched off in low-beam pattern or being switched on in high-beam pattern, whereby said low-beam pattern achieves 100% light utilization of said light source and any moving part is avoided, eliminating the ubiquitous drawbacks of low light utilization and having a moving part in all existing dual-beam projector headlight designs.

21. The projector headlight of claim 20 wherein said partition means is a baffle, and said low-beam light-emitting subassembly and said switchable high-beam light-emitting subassembly are approximately horizontally separated by said baffle.

22. The projector headlight of claim 20 wherein said partition means is a baffle that has predetermined dimensions, a predetermined shape, or predetermined dimensions and a predetermined shape, and said low-beam light-emitting subassembly and said switchable high-beam light-emitting subassembly are approximately horizontally separated by said baffle.

23. The projector headlight of claim 20 wherein said condenser lens comprises at least one optical treatment.

24. A projector headlight, comprising:

a. a reflector comprising a predetermined shape, b. a condenser lens comprising predetermined optical characteristics and being disposed in a predetermined position, c. a light source comprising a switchable low-beam light-emitting subassembly and a switchable high-beam light-emitting subassembly, d. said switchable low-beam light-emitting subassembly being disposed in a predetermined low-beam position for low-beam pattern and said switchable high-beam light-emitting subassembly being disposed in a predetermined high-beam position for high-beam pattern, and e. said switchable low-beam light-emitting subassembly being powered on and said switchable high-beam light-emitting subassembly being switched off in said low-beam pattern, whereas said switchable low-beam light-emitting subassembly being switched off and said switchable high-beam light-emitting subassembly being powered on in said high-beam pattern, whereby said low-beam pattern achieves 100% light utilization of said light source and any moving part is avoided, eliminating the ubiquitous drawbacks of low light utilization and having a moving part in all existing dual-beam projector headlight designs.

25. The projector headlight of claim 24 wherein said switchable low-beam light-emitting subassembly is switched on in said high-beam pattern.

26. The projector headlight of claim 24 wherein said condenser lens comprises at least one optical treatment.

* * * * *